US008792849B2

(12) United States Patent
Kurose et al.

(10) Patent No.: US 8,792,849 B2
(45) Date of Patent: Jul. 29, 2014

(54) NEAR FIELD RADIO COMMUNICATION APPARATUS AND MOBILE RADIO TERMINAL (75) Inventors: Kengo Kurose, Hamura (JP); Takashi Minemura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 968 days.

(21) Appl. No.: 12/883,371

(22) Filed: Sep. 16, 2010

(65) Prior Publication Data

US 2011/0159869 A1 Jun. 30, 2011

(30) Foreign Application Priority Data

Dec. 25, 2009 (JP) ................................. 2009-295621
Dec. 25, 2009 (JP) ................................. 2009-296340
Mar. 18, 2010 (JP) ................................. 2010-063318
Jul. 20, 2010 (JP) ................................. 2010-163348

(51) Int. Cl.
*H04B 1/16* (2006.01)

(52) U.S. Cl.
USPC ........ 455/343.5; 455/572; 455/573; 455/574; 455/423; 455/425; 455/343.1; 455/343.2; 455/343.6; 455/41.1; 455/41.2; 320/114; 320/121; 320/123; 320/137; 320/138; 340/10.1; 340/10.34; 340/635; 340/636.1; 340/636.15; 340/636.2

(58) Field of Classification Search
USPC .......... 455/572–574, 343.1–343.6, 423, 425, 455/41.1, 41.2; 320/101, 114, 116, 117, 320/121, 123, 137, 138; 340/635, 636.1, 340/636.15, 636.19, 636.2, 10.1, 10.34
See application file for complete search history.

(56) References Cited

U.S. PATENT DOCUMENTS

| 5,073,781 | A  | * | 12/1991 | Stickelbrocks | ................. | 342/51 |
| 5,608,406 | A  | * | 3/1997  | Eberth et al. | .................... | 342/51 |
| 6,462,647 | B1 | * | 10/2002 | Roz           | ............................. | 340/10.1 |
| 7,268,517 | B2 | * | 9/2007  | Rahmel et al. | ................ | 320/101 |
| 8,035,335 | B2 | * | 10/2011 | Duron et al.  | .................. | 320/101 |
| 8,160,655 | B2 | * | 4/2012  | Kroll et al.  | .................... | 455/573 |

FOREIGN PATENT DOCUMENTS

| JP | 10-056673   | A | 2/1998  |
| JP | 11-145912   | A | 5/1999  |
| JP | 11-186927   | A | 7/1999  |
| JP | 2000-228647 | A | 8/2000  |
| JP | 2002-101475 | A | 4/2002  |
| JP | 2005-300441 | A | 10/2005 |

(Continued)

OTHER PUBLICATIONS

Japanese Office Action dated Jul. 26, 2011 (and English translation thereof) in counterpart Japanese Application No. 2010-163348.

(Continued)

*Primary Examiner* — Tuan A Tran
(74) *Attorney, Agent, or Firm* — Holtz Holtz Goodman & Chick PC (57) ABSTRACT According to one embodiment, a near field radio communication apparatus, as described in embodiments, comprises a signal receiving unit configured to convert a radio signal into an electric signal an information obtaining unit configured to obtain information from a signal output from the signal receiving unit and an operating power supplying unit configured to supply an operating power to the information obtaining unit if a voltage level of the electric signal output from the signal receiving unit varies to he equal to or higher than a preset threshold value.

30 Claims, 7 Drawing Sheets

(56) References Cited

FOREIGN PATENT DOCUMENTS

| JP | 2007-027899 A | 2/2007 |
| JP | 2009-089434 A | 4/2009 |
| JP | 2009-267896 A | 11/2009 |

OTHER PUBLICATIONS

Japanese Office Action dated Nov. 29, 2011 (and English translation thereof) in counterpart Japanese Application No. 2010-163348.

* cited by examiner

| Signaling Rate | Modulation | Rate tolerance % of Rate | Pulse Duration Minimum | Pulse Duration Normal | Pulse Duration Maximum |
|---|---|---|---|---|---|
| 2.4kb/s | RZI | +/-0.87 | 1.41us | 78.13us | 88.55us |
| 9.6kb/s | RZI | +/-0.87 | 1.41us | 19.53us | 22.13us |
| 19.2kb/s | RZI | +/-0.87 | 1.41us | 9.77us | 11.07us |
| 38.4kb/s | RZI | +/-0.87 | 1.41us | 4.88us | 5.96us |
| 57.6kb/s | RZI | +/-0.87 | 1.41us | 3.26us | 4.34us |
| 115.2kb/s | RZI | +/-0.87 | 1.41us | 1.63us | 2.23us |
| 0.576Mb/s | RZI | +/-0.1 | 295.2ns | 434.0ns | 520.8ns |
| 1.152kb/s | RZI | +/-0.1 | 147.6ns | 217.0ns | 260.4ns |
| 4.0Mb/s (sungle pulse) | 4PPM | +/-0.01 | 115.0ns | 125.0ns | 135.0ns |
| (double pulse) | 4PPM | +/-0.01 | 240.0ns | 250.0ns | 260.0ns |

| BOF(C0h) | ADD | Control | Information | CRC16 | EOF |
|---|---|---|---|---|---|

NEAR FIELD RADIO COMMUNICATION APPARATUS AND MOBILE RADIO TERMINAL

CROSS-REFERENCE TO RELATED APPLICATIONS

This application is based upon and claims the benefit of priority from Japanese Patent Applications No. 2009-295621, filed Dec. 25, 2009; No. 2009-296340, filed Dec. 25, 2009; No. 2010-063318, filed Mar. 18, 2010; and No. 2010-163348, filed Jul. 20, 2010; the entire contents of all of which are incorporated herein by reference.

FIELD

Embodiments described herein relate generally to a near field radio communication apparatus.

BACKGROUND

Some battery-driven electronic devices such as mobile telephones, digital cameras, PDA (Personal Digital Assistants) and the like have a function for near field radio communication using infrared rays.

The mobile electronic devices have a serious problem that a power consumption should be suppressed since they are driven by batteries. Thus, in the infrared communication function, too, supply of an electric power to an infrared communication unit is stopped until en instruction to execute infrared communication is given by the user, and the electric power is thereby saved.

In such a conventional near field radio communication apparatus, however, there is a problem that the user needs to execute a plurality of key operations to turn on the near field radio communication function via a user interface, which is useless for the user and inconvenient for, particularly, aged persons who are unfamiliar with operations of the electronic device.

Recently, an electronic device is equipped with a solar power generation panel, and a battery thereof is thereby charged.

DETAILED DESCRIPTION

In general, according to one embodiment, a near field radio communication apparatus includes a signal receiving unit, an information obtaining unit, and an operating power supplying unit. The signal receiving unit is configured to convert a radio signal into an electric signal. The information obtaining unit is configured to obtain information from a signal output from the signal receiving unit. The operating power supplying unit is configured to supply an operating power to the information obtaining unit if a voltage level of the electric signal output from the signal receiving unit varies to be equal to or higher than a preset threshold value.

An embodiment of the present invention will be explained below with reference to the accompanying drawings.

A near field radio communication apparatus according to the embodiment is provided at, for example, battery-driven electronic devices such as mobile telephones, digital cameras, PDA (Personal Digital Assistants) and the like, and is equipped with an infrared communication function and a light power generation panel for generating power by incident light such as solar light. The electronic device is exemplified by a mobile telephone in the following descriptions.

Figure 1:
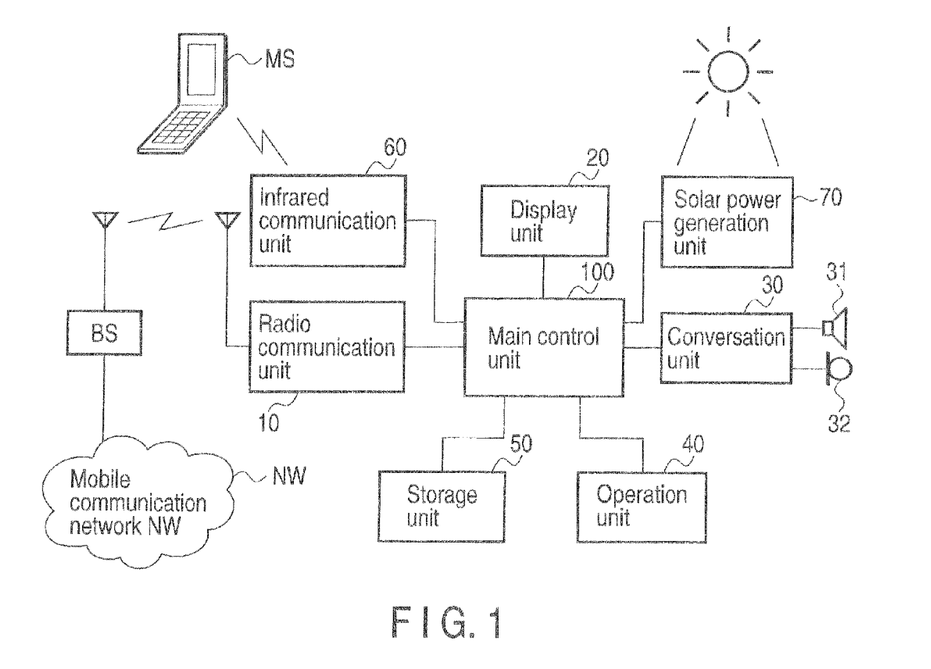
FIG. 1 is a block diagram showing a structure of mobile telephone comprising an infrared communication unit according to an embodiment.

FIG. 1 is a block diagram showing a structure of the mobile telephone comprising the infrared communication apparatus according to the embodiment. As shown in FIG. 1, the mobile telephone comprises, as its main constituent elements, a main control unit 100, a radio communication unit 10, a display unit 20, a conversation unit 30, an operation unit 40, a storage unit 50, an infrared communication unit 60, a solar power generation unit 70, and also comprises a function of executing communication via a base station apparatus BS and a mobile communication network NW and infrared communication with an counterpart device having an infrared communication function.

The radio communication unit 10 executes radio communications with the base station apparatus BS accommodated in the mobile communication network NW, under instructions of the main control unit 100, and thereby executes the transmission and reception of speech data and electronic mail data and the reception of Web data, streaming data and the like.

The display unit 20 displays images (still images and moving images), character information and the like and visually transmits the information to the user, under control of the main control unit 100. The display unit 20 also displays information indicating a setting status of the mobile telephone, and the like.

The conversation unit 30 comprises a speaker 31 and a microphone 32, converts user's speech input through the microphone 32 into speech data which can be processed by the main control unit 100 and outputs the speech data to the main control unit 100, and decodes speech data received by the radio communication unit 10 or infrared communication unit 60 and outputs the decoded speech data from the speaker 31.

The operation unit 40 comprises a plurality of key switches and the like, and accepts the instructions from the user via the key switches and the like.

The storage unit 50 stores control programs and control data of the main control unit 100, application software, address data associated with names, telephone numbers and the like of the other communication counterparts, data of transmitted and received emails, Web data downloaded by Web browsing, and downloaded content data, and temporarily stores streaming data and the like. The storage unit 50 comprises one or plural storage units such as HDD, RAM, ROM, IC memories and the like.

The infrared communication unit 60 executes the infrared communication with the counterpart device (for example, other mobile telephone MS) having the infrared communication function, and has operations set by the main control unit 100. The infrared communication unit 60 transmits the transmission data supplied from the main control unit 100 by the infrared light, receives data transmitted from the counterpart device by the infrared light, and outputs the data as reception data to the main control unit 100.

The solar power generation unit 70 comprises a solar battery module of a silicon type, a compound type, an organic type, a quantum dot type and the like, and a power supply circuit configured to rectify the electric power generated by a photovoltaic effect using the solar battery module and charge the battery. Details of the solar power generation unit 70 will be described later.

The control unit 100 comprises a microprocessor, operates under the control programs and control data stored in the storage unit 50, and controls each of the units in the mobile telephone. The control unit 100 also comprises a network communication controlling function of controlling each of the units in the communication system to execute the speech communication and the data communication, an application processing function, and a solar power generation controlling function.

The application processing function controls the infrared communication unit 60 to execute data communication with the counterpart device, transmit and receive electronic mails, and execute Web browsing and the like by urging the main control unit 100 to operate under the application software stored in the storage unit 50.

The solar power generation controlling function controls charging a drive battery with electric power generated by the solar power generation unit 70, detects an output voltage and a temperature of the battery, intermittently charges the battery in response to the detection, and thereby prevents overcharge of the battery.

In addition, the main control unit 100 comprises an image processing function of urging the display unit 20 to display the images, on the basis of the image data (data of still images and moving images) such as received data, downloaded streaming data and the like. By the image processing function, the main control unit 100 decodes the image data, subjects the decoding result to image processing, and urges the display unit 20 to display the images. Not only the image data, but also various types of data such as address data, text data and the like can be transmitted and received as the data transmitted and received by the infrared communication unit 60.

Figure 2:
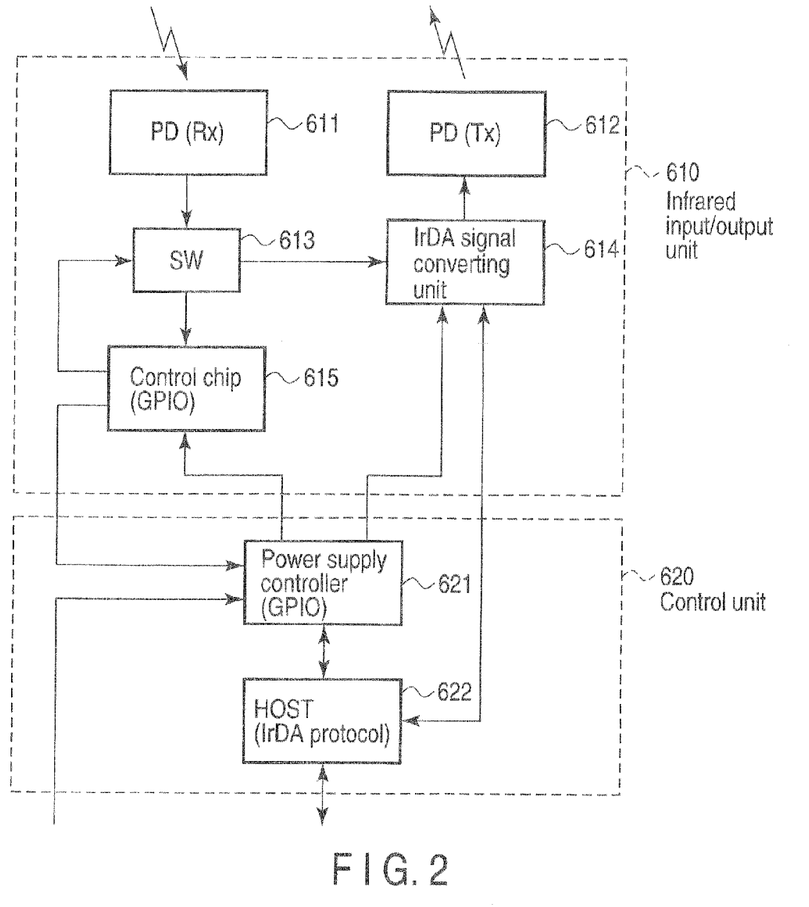
FIG. 2 is a block diagram showing a structure of the infrared communication unit shown in FIG. 1.

FIG. 2 shows a detailed structure of the infrared communication unit 60. As shown in the figure, the infrared communication unit 60 comprises an infrared input/output unit 610 and a control unit 620. The infrared input/output unit 610 comprises a photodetector (PD(Rx)) 611, a photodetector (PD(Tx)) 612, a change-over switch (SW) 613, an IrDA signal converting unit 614, and a control chip 615. The control unit 620 comprises a power supply controller 621 and a host module (HOST) 622.

The photodetector 611 is a light receiving device which receives the incident light from the outside. The photodetector 611 particularly detects infrared rays, converts a current value corresponding to strength of the detected infrared rays into a voltage, and outputs a detection signal. In other words, the photodetector 611 converts the infrared signal received from the outside into an electric signal.

The photodetector 612 is a light emitting device which emits infrared light according to the transmission signal supplied from the IrDA signal converting unit 614 to be described later. In other words, the photodetector 612 converts the electric signal into the infrared signal and outputs the infrared signal to the outside.

The change-over switch 613 is controlled under instructions supplied from the control chip 615 to be described later, to output the detection signal supplied from the photodetector 611 selectively to the IrDA signal converting unit 614 or the control chip 615.

The IrDA signal converting unit 614 amplifies the detection signal input from the photodetector 611 via the change-over switch 613, converts the detection signal into H/L digital data by a comparator, decodes the H/L digital data to an H/L signal length which can be recognized by the host, and outputs reception data obtained by the decoding to the host module 622.

In addition, the IrDA signal converting unit 614 generates a transmission signal by encoding the transmission data supplied from the host module 622, and outputs the transmission signal to the photodetector 612. The IrDA signal converting unit 614 is provided with an operating power from the power supply controller 621 to be described later. As for the modulation/demodulation processing of the IrDA signal converting unit 614, the host module (Host) to be described layer may be equipped with the relevant function.

The control chip 615 comprises a function of detecting that the infrared signal has been input to the photodetector 611, and a function of controlling the change of the change-over switch 613. In a case where the control chip 615 is in a state of being supplied with no electric power, i.e., the control chip 615 is in an OFF state, the control chip 615 sets the change-over switch 613 to output the detection signal input from the photodetector 611 to the change-over switch 613, to the IrDA signal converting unit 614. In a case where the control chip 615 is in a state of being supplied with the electric power, i.e., the control chip 615 is in an ON state, the control chip 615 monitors the detection signal output from the photodetector 611 and, if supplied with a detection signal having a greater signal strength than a preset threshold value, notifies the power supply controller 621 of the supply of the detection signal.

To execute such a control, the control chip 615 comprises an interface capable of establishing communication with the control unit 620 by serial/parallel digital signals, such as GPIO (General Purpose I/O). The control chip 615 merely executes monitoring/detection of the detection signal, and outputting the signal in association with the monitoring/detection as described above, and can be implemented by the comparator. Therefore, the consumed current is in a range of approximately a few µA to tens of µA, which is extremely small as compared with the consumed current (tens of mA) of the control unit 620 in a case where the host module (HOST) 622 is in an operating state. In FIG. 2, the control chip 615 is constituted to comprise a signal amplifier which amplifies the signal input level from the photodetector 611 more greatly than the threshold value of the comparator but, naturally, may use a signal amplifier built in the IrDA signal converting unit 614.

The power supply controller 621 operates in an operation mode set by the main control unit 100, and comprises a power supply unit which supplies the electric power stored in a battery built in the mobile telephone, selectively, to each unit in the infrared communication unit 60. The operation mode is a general mode or an eco-easy mode. In addition, the power supply controller 621 further comprises a GPIO (General Purpose I/O) interface. In the eco-easy mode, the power supply controller 621 can suppress the operating power by temporarily suspending the power supply unit and operating the GPIO interface alone.

In addition, the power supply controller 621 further comprises an infrared input/output unit controlling function of controlling the operations of the IrDA signal converting unit 614 and control chip 615 in accordance with the generated power capacity P notified by the solar power generation unit 70 to be described later and the operation mode.

Figure 3:
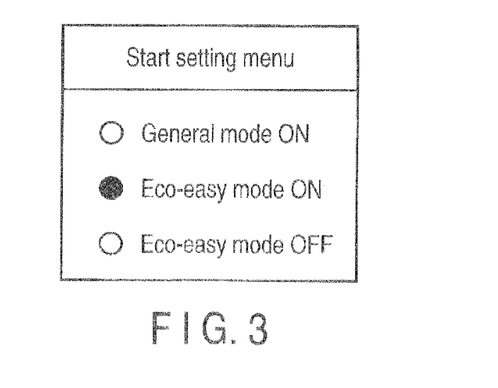
FIG. 3 is an illustration showing an example of a menu display at setting activation of the infrared communication unit shown in FIG. 1.

The setting of the operation mode is accepted from the user by the main control unit 100. The main control unit 100 urges the display unit 20 to display a start setting menu as shown in FIG. 3 and accepts the start (ON) or end (OFF) of either of the operation modes by the user operation executed by means of the operation unit 40. The main control unit 100 notifies the power supply controller 621 of the instruction accepted from the user, and the power supply controller 621 sets the power supply of each unit to be ON or OFF in accordance with the setting. Details of the operation will be described later.

The host module 622 controls data transmission and reception using the infrared signal by means of the IrDA signal converting unit 614, under the IrDA protocol. Besides, the host module 622 supplies the transmission data supplied from the main control unit 100 to the IrDA signal converting unit 614, and outputs the reception data output from the IrDA signal converting unit 614 to the main control unit 100.

Incidentally, the frequency at which the electronic device comprising the solar power generation panel is positively left at a location irradiated with solar light is increased. It is confirmed that if the solar light is incident on a light receiving unit of the infrared communication unit, the electric power is consumed at the photodetector (PD(Rx)) 611.

Figure 4:
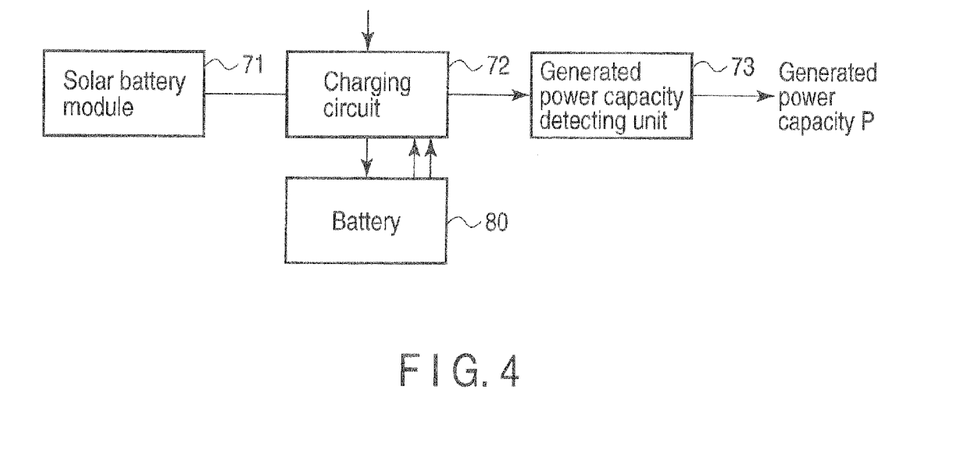
FIG. 4 is a block diagram showing a structure of a solar power generation unit shown in FIG. 1.

The solar power generation unit 70 comprises a solar battery module 71, a charging circuit 72 and a generated power capacity detecting unit 73 as shown in FIG. 4.

The solar battery module 71 is configured to convert the light energy into the electric power by the photovoltaic effect, and is constituted by aligning a plurality of solar battery panels of a silicon type, a compound type, an organic type, a quantum dot type and the like, serially and/or parallel. The solar battery module 71 is provided on a housing of the mobile telephone such that the electric power is generated by making light such as solar light incident on the solar battery (cells).

The charging circuit 72 detects an output voltage and temperature of a battery 80, rectifies the electric power obtained by the solar battery module 71, and intermittently supplying the electric power to the battery 80 in accordance with the instruction from the main control unit 100, and thereby executes charging while preventing the overcharging to the battery 80.

The generated power capacity detecting unit 73 detects generated power capacity P per unit time, of the power generated by the solar battery module 71, and notifies the power supply controller 621 of the detected generated power capacity P.

Next, the operation of the mobile telephone will be described. The following description is particularly focused on the operation of the infrared communication unit 60. As described above, the operation mode of the infrared communication unit 60 is the general mode or eco-easy mode, which is selected by means of the operation unit 40, by the user.

Figure 5:
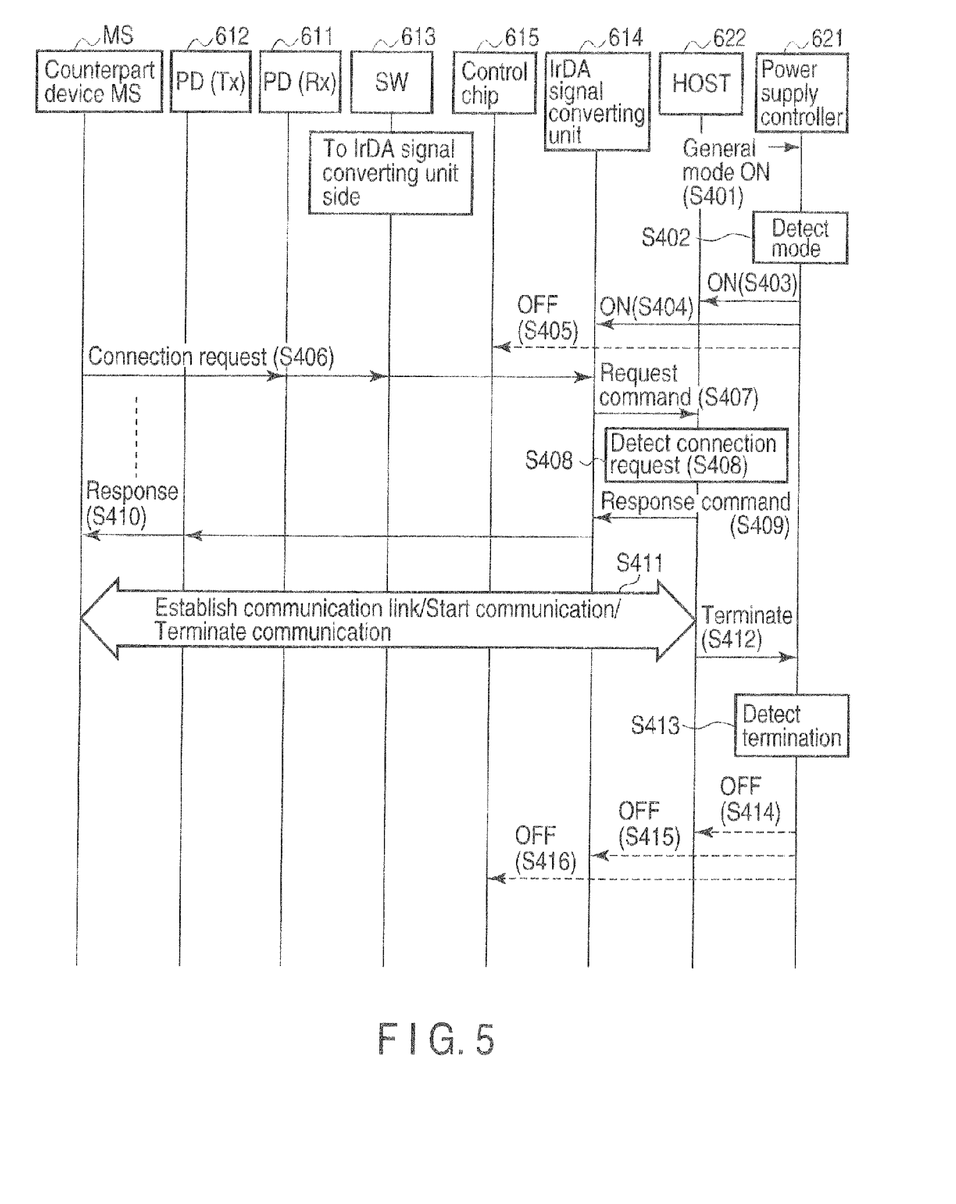
FIG. 5 is a flowchart for explaining an operation in a general mode, in the infrared communication unit shown in FIG. 1.

First, the operations in a case where the general mode is set to be ON will now be described with reference to FIG. 5.

If the user operates the operation unit 40 and selects "General mode ON" in a state in which the main control unit 100 urges the display unit 20 to display the start setting menu shown in FIG. 3, the main control unit 100 requests the power supply controller 621 to operate in the general mode (sequence S401).

The power supply controller 621 detects that the requested mode is the general mode (sequence S402), and the power supply unit built in the power supply controller 621 operates, supplies the electric power to the host module 622 (sequence S403), supplies the electric power to the IrDA signal converting unit 614 (sequence S404), to turn ON each of them. The control chip 615 is supplied with no power and remains OFF (sequence S405). For this reason, the change-over switch 613 is in a state of being set to output the output of the photodetector 611 to the IrDA signal converting unit 614.

Immediately after that, if an infrared signal (connection request, SNRM command) to execute infrared communication with the mobile telephone is output from an counterpart device MS, the photodetector 611 receives the infrared signal, generates the detection signal by photoelectric transfer, and outputs the detection signal to the IrDA signal converting unit 614 via the change-over switch 613 (sequence S406). The counterpart device MS transmits the connection request command (SNRM command) repeatedly, at a predetermined number of times, in a predetermined cycle, in the SIR mode of 9.6 kbps until receiving a response command (UA command) from the mobile telephone.

The IrDA signal converting unit 614 decodes the detection signal, obtains a request command (SNRM (Set Normal Response Mode) command) to request the connection, and outputs the request command to the host module 622 (sequence S407). The host module 622 supplied with the request command analyzes this command, refers to capability information and the like, determines in which communication mode of SIR (transfer rate: 2.4-115.2 kbps), MIR (transfer rate: 0.576M-1.152 Mbps) and FIR (transfer rate: 4 Mbps) the connection request is made, and selects the mode of the highest possible communication speed (sequence S408).

The host module 622 generates a response command (UA command) indicating that communication is executed in the selected mode and outputs the response command the IrDA signal converting unit 614, under IrLAP (Infrared Link Access Protocol) (sequence S409). The IrDA signal converting unit 614 generates the transmission signal by encoding the response command, and outputs the transmission signal to the photodetector 612 (sequence S410). The photodetector 612 inputting the transmission signal emits the transmission signal based on the transmission signal into the outer space towards the counterpart device MS.

After that, the infrared communication link is established under the IrLAP between the counterpart device MS and the host module 622 and the infrared communication is executed through the link to execute bidirectional data transmission and reception. The reception data obtained from the counterpart device MS is output to the main control unit 100 and recorded in, for example, the storage unit 50. On the other hand, when the data transmission is executed, the main control unit 100 reads the data to be transmitted, from, for example, the storage unit 50, converts the data into the infrared signal and outputs the infrared signal. After that, when the data transmission is terminated, the host module 622 opens the communication link with the counterpart device (sequence S411) and notifies the power supply controller 621 that the data communication has been terminated (sequence S412), under predetermined procedures.

If the power supply controller 621 receives notification of termination from the host module 622 (sequence S413), the power supply controller 621 stops the power supply to the host module 622 (sequence S414) and stops the power supply to the IrDA signal converting unit 614 (sequence S415) to turn OFF each of them. The control chip 615 is still supplied with no electric power and remains OFF (sequence S416).

In the infrared communication apparatus having the above-described structure, in the general mode, the IrDA signal converting unit 614, the power supply controller 621 and the host module 622 are supplied with the electric power to operate in the only period between the time when the user instruction (general mode ON) is made and the time when the communication is terminated, and the power consumption is thereby suppressed. However, the user needs to display the start setting menu as shown in FIG. 3 and execute settings.

Next, the operations in a case where the eco-easy mode is set to be ON will now be described with reference to FIG. 6.

If the user operates the operation unit 40 and selects "eco-easy mode ON" in a state in which the main control unit 100 urges the display unit 20 to display the start setting menu shown in FIG. 3, the main control unit 100 requests the power supply controller 621 to operate in the eco-easy mode (sequence S501).

The power supply controller 621 detects that the requested mode is the eco-easy mode (sequence S502), supplies no electric power to the host module 622 (sequence S503), and supplies no electric power to the IrDA signal converting unit 614 (sequence S504), such that they remain OFF. On the other hand, the power supply controller 621 supplies the electric power to the control chip 615 to turn ON the control chip 615 (sequence S505).

In accordance with this, the change-over switch 613 is set to output the output of the photodetector 611 to the control chip 615, by the control chip 615 (sequence S506). The power supply controller 621 turns ON the built-in GPIO, turns OFF the other functions to transfer to the power saving mode, and monitors the notification of start from the control chip 615, by the GPIO (sequence S507).

In this state, since the GPIO in each of the control chip 615 and the power supply controller 621 merely operates, the consumed power is remarkably lower as compared with a case where the IrDA signal converting unit 614 and the host module 622 operate, but generation of the connection request from the counterpart device MS is monitored by the control chip 615.

Immediately after that, if an infrared signal (connection request, SNRM command) to execute infrared communication with the mobile telephone is output from the counterpart device MS, the photodetector 611 receives the infrared signal, generates the detection signal by photoelectric transfer, and outputs the detection signal to the control chip 615 via the change-over switch 613 (sequence S508). The counterpart device MS transmits the connection request command (SNRM command) repeatedly, at a predetermined number of times, in a predetermined cycle, in the SIR mode of 9.6 kbps until receiving the response command (UA command) from the mobile telephone.

If a detection signal having a strength equal to or greater than a preset threshold value is input from the photodetector 611 via the change-over switch 613, the GPIO built in the control chip 615 recognizes that the connection request has been generated from the counterpart device MS (sequence S509) and makes a notification of start to the power supply controller 621 (sequence S510). The GPIO (control chip 615) may operate intermittently. A method of detecting the connection request in sequence S509 will be described later.

In the power supply controller 621, if the built-in GPIO detects the notification of start (sequence S511), the operation of the power supply unit is started. The power supply controller 621 thereby supplies the electric power to the host module 622 (sequence S512) and supplies the electric power to the IrDA signal converting unit 614 (sequence S513) to turn ON each of them. On the other hand, the power supply controller 621 stops the supply of the electric power to the control chip 615 to turn it OFF (sequence S514). The change-over switch 613 thereby returns the setting to output the output of the photodetector 611 to the IrDA signal converting unit 614 (sequence S515).

At this time, too, the counterpart device MS transmits the connection request command (SNRM command) repeatedly, at a predetermined number of times, in a predetermined cycle (sequence S516). The photodetector 611 receives the connection request command, generates the detection signal by photoelectric transfer, and outputs the detection signal to the IrDA signal converting unit 614 via the change-over switch 613.

The IrDA signal converting unit 614 decodes the detection signal, obtains the request command (SNRM (Set Normal Response Mode) command) to request the connection, and outputs the request command to the host module 622 (sequence S517). The host module 622 supplied with the request command analyzes this command, refers to the capability information and the like, determines in which communication mode of SIR, MIR and FIR the connection request is made, and selects the mode of the highest possible communication speed (sequence S518).

The host module 622 generates the response command (UA command) indicating that communication is executed in the selected mode and outputs the response command to the IrDA signal converting unit 614, under the IrLAP (Infrared Link Access Protocol) (sequence S519). The IrDA signal converting unit 614 generates the transmission signal by encoding the response command, and outputs the transmission signal to the photodetector 612 (sequence S520). The photodetector 612 inputting the transmission signal emits the transmission signal based on the transmission signal into the outer space towards the counterpart device MS.

After that, the infrared communication link is established under the IrLAP between the counterpart device MS and the host module 622 and the infrared communication is executed through the link to execute data transmission and reception. The reception data obtained from the counterpart device MS is output to the main control unit 100 and recorded in, for example, the storage unit 50. On the other hand, when the data transmission is executed, the main control unit 100 reads the data to be transmitted, from, for example, the storage unit 50, converts the data into the infrared signal and outputs the infrared signal. After that, when the data transmission is terminated, the host module 622 opens the communication link with the counterpart device (sequence S521) and notifies the power supply controller 621 that the data communication has been terminated (sequence S522), under predetermined procedures.

If the power supply controller 621 receives notification of termination from the host module 622 (sequence S523), the power supply controller 621 stops the power supply to the host module 622 (sequence S524) and stops the power supply to the IrDA signal converting unit 614 (sequence S525) turn OFF each of them. In addition, the power supply controller 621 supplies the electric power to the control chip 615 to turn it ON (sequence S526).

In accordance with this, the change-over switch 613 is set to output the output of the photodetector 611 to the control chip 615, by the control chip 615 (sequence S527). The power supply controller 621 turns ON the built-in OPIO, turns OFF the other functions to transfer to the power saving mode, and monitors the notification of start from the control chip 615, by the GPIO (sequence S528). After this, processing of transfer to sequence S508 is repeatedly executed.

If the "eco-easy mode OFF" shown in FIG. 3 is selected in a state in which the "eco-easy mode" is ON, the main control unit 100 requests the power supply controller 621 to transfer to the general mode. Processing from sequence S402 is thereby started.

Next, a method of detecting the connection request in sequence S509 will now be described.

Figure 7:
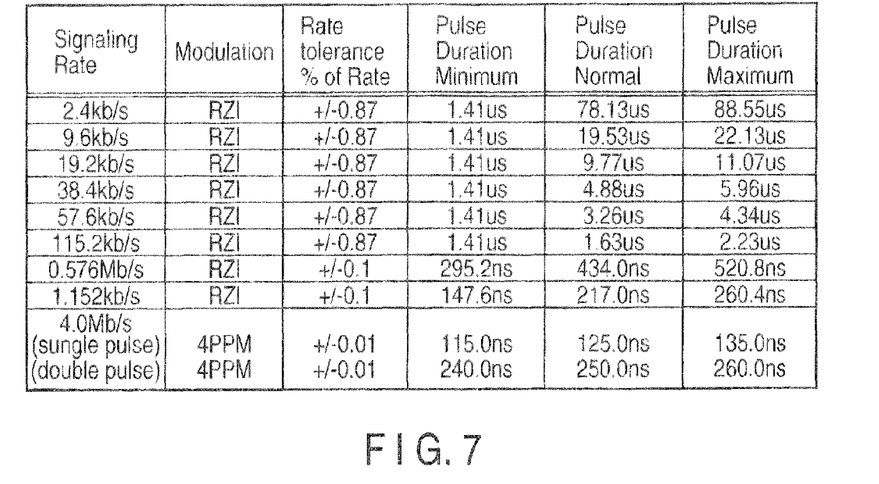
FIG. 7 is a table showing correspondence between a transfer rate and a transmission period in an IrDA communication standard.
Figure 8:
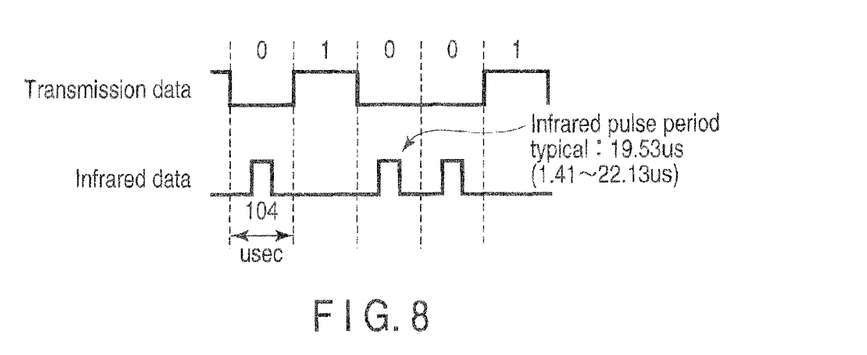
FIG. 8 is an illustration showing a pulse of a transmission data in RZI modulation.

A transfer rate and Pulse Duration (transmission period) are defined under the IrDA communication standard, as shown in FIG. 7. As for the connection request command (SNRM command) transmitted by the counterpart device MS in sequence S508, the transmission is executed in the SIR mode at 9.6 kbps as described above, and employs RZI modulation. As shown in FIG. 8, the infrared pulse is transmitted if the transmission pulse is 0 while the infrared pulse is not transmitted if the transmission pulse is 1. The transmission period of the infrared pulse in the SIR mode at 9.6 kbps is defined as 1.41-22.13 (Typical: 19.53) usec in the bit transmission period of 104 usec, as shown in FIG. 8.

Figure 9:
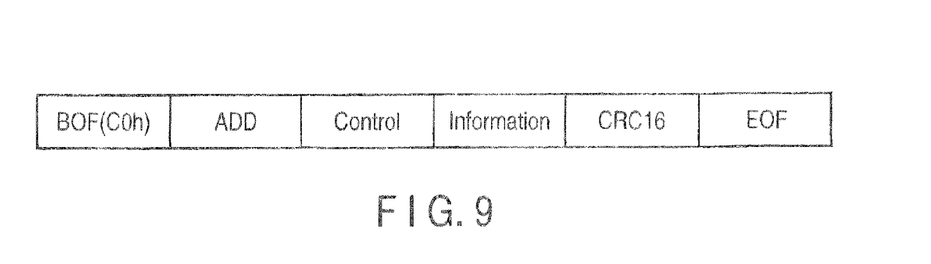
FIG. 9 is an illustration showing a frame format in SIR mode.

In addition, the frame format in the SIR mode is constituted as shown in FIG. 9, and is also applied to the connection request command in sequence S406 and sequence S508. In the general mode shown in FIG. 5, the command content is analyzed and the connection request is determined by referring to the control field and the information field, of the fields shown in FIG. 9, in sequence S408. Since the command analysis is thus executed by the host module 622, the power consumption occurs at the host module 622.

However, the communication distance in the infrared communication may be often within 20 cm in consideration of the general use. Therefore, even if the command content is not analyzed, determining that the connection request has been generated for the mobile telephone is effective at the time of detecting the frame shown in FIG. 9.

Figure 6:
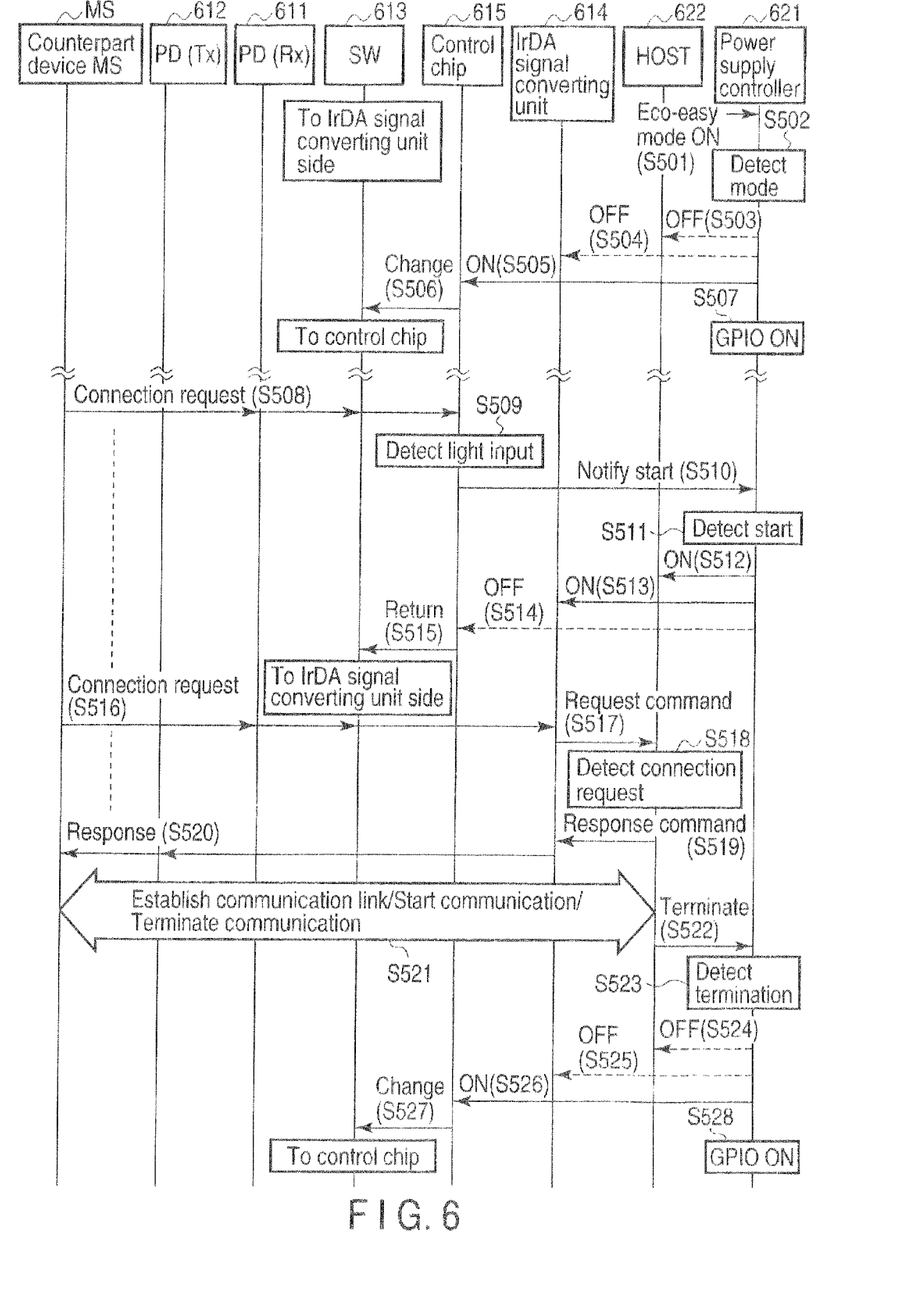
FIG. 6 is a flowchart for explaining an operation in an eco-easy mode, in the infrared communication unit shown in FIG. 1.

In the eco-easy mode shown in FIG. 6, if "C0h" of the leading BOF field, of the fields shown in FIG. 9, is detected by the GPIO built in the control chip 615, in sequence S509, it is determined that the connection request has been generated for the mobile telephone.

Figure 10:
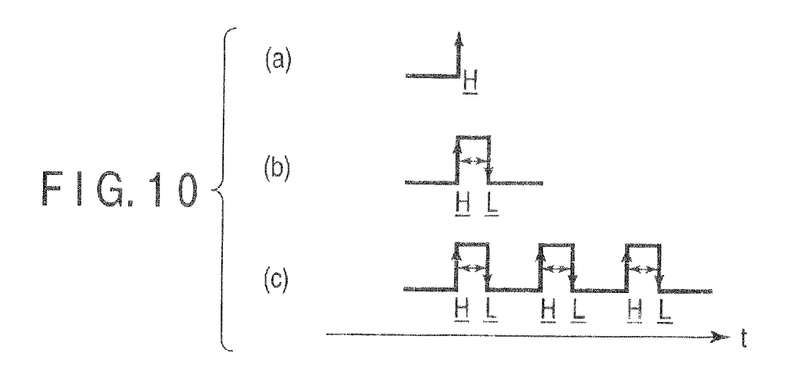
FIG. 10 an illustration showing a method of determining a connection request of a control chip shown in FIG. 2.

More specifically, the control chip 615 monitors the signal voltage based on the infrared pulse and detects variation thereof as shown in FIGS. 10(*a*), (*b*) and (*c*), and determines that the connection request has been generated for the mobile telephone.

In other words, a method of detecting a rise of an edge in the infrared pulse, a method of detecting both of a rise and a fall of the edge in the infrared pulse and increasing the resistance to interference as shown in FIG. 10(*b*), a method of detecting a plurality of sets of the rise and fall of the edge in the infrared pulse and recognizing their pattern (hit) as shown in FIG. 10(*c*), and the like are conceived. In other words, it is determined that the connection request has been generated for the mobile telephone, by recognizing part of the frame format in the SIR mode at 9.6 kbps.

In the detecting method shown in FIG. 10(*a*), the control chip 615 detects the voltage level of the electric signal output from the photodetector 611 and then determines that the connection request has been generated for the mobile telephone if the detected value rises from a value smaller than a preset value to a value equal to or greater than the threshold value.

In the detecting method shown in FIG. 10(*b*), the control chip 615 detects the voltage level of the electric signal output from the photodetector 611 and then determines that the connection request has been generated for the mobile telephone if the detected value rises from a value smaller than a preset value to a value equal to or greater than the threshold value and lowers below the threshold value.

In the detecting method shown in FIG. 10(*c*), the control chip 615 detects the voltage level of the electric signal output from the photodetector 611 and then determines that the connection request has been generated for the mobile telephone if the detected value repeats in a predetermined cycle rising from a value smaller than a preset value to a value equal to or greater than the hreshold value and lowering below the threshold value.

In the mobile telephone having the above-described structure, in the eco-easy mode, once the user instruction (eco-easy mode ON) is made, the GPIO in each of the control chip 615 and the power supply controller 621 is merely in an operating status, monitors the generation of the connection request from the counterpart device MS in a status in which the power consumption is significantly lowered as compared with a case where the IrDA signal converting unit 614 and the hest module 622 operate. When the communication is started and then terminated, the GPIO becomes again in a status of monitoring generation of a new connection request in the eco-easy mode.

Thus, once the eco-easy mode is set in the mobile telephone having the above-described structure, the generation of the request for the infrared communication can be monitored irrespective of low power consumption, and the infrared communication can be executed if the request is made. Therefore, the mobile telephone has high operability for the user and can be easily handled while suppressing the power consumption of the infrared communication function. On the other hand, in the general mode, the power consumption at the part concerning the communication is generated only when the communication is executed. However, since the general mode needs to be activated every time the communication is executed, the mobile. telephone has low operability for the user.

In the eco-easy mode, once the user instruction (eco-easy mode ON) is made, the only GPIO built in the power supply controller 621 is in the operating status, besides supplying the operating power to the control chip 615, until the control chip 615 detects the connection request. The power consumption at the power supply controller 621 can also be suppressed.

Figure 11:
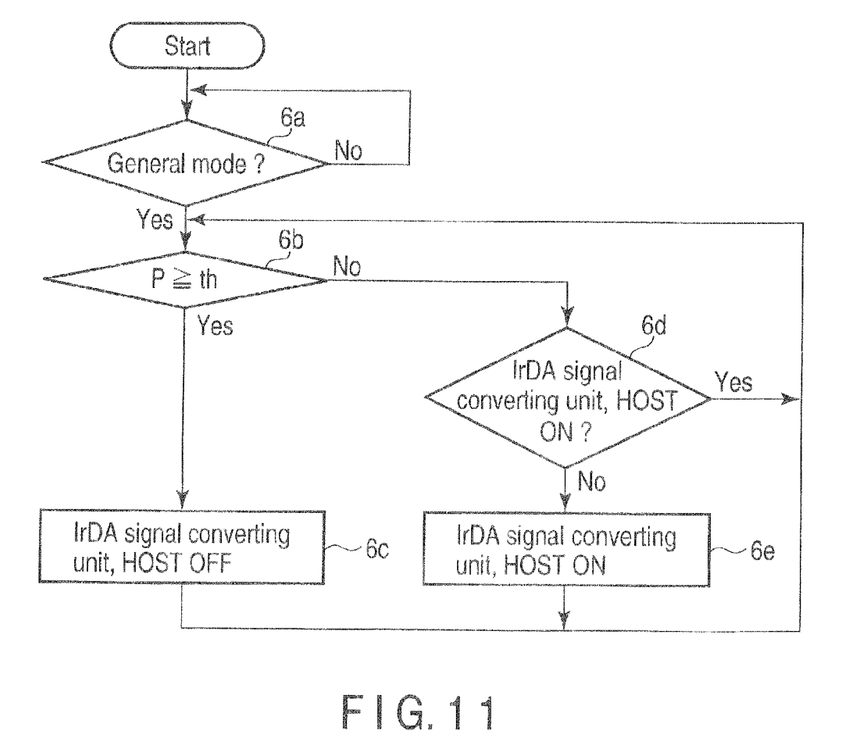
FIG. 11 is a flowchart showing operations of a power supply controller shown in FIG. 1.

Next, the infrared input/outout unit controlling function of the power supply controller 621 will be described with reference to FIG. 11. A flowchart shown in FIG. 11 is repeatedly executed by the power supply controller 621 while the power supply controller 621 operates.

First, in step 6*a*, the power supply controller 621 determines whether the operation mode set by the user is the general mode or not. If the general mode is set, the operation shifts to step 6*b*. If the eco-easy mode is set, the power supply controller 621 contin monitoring the operation mode in step 6*a* again.

In step 6*b*, the power supply controller 621 determines whether the power capacity per unit time generated by the solar battery module 71 is equal to or greater than preset threshold value th or not, on the basis of generated power capacity P notified by the generated power capacity detecting unit 73. In other words, the power supply controller 621 determines whether the mobile telephone is left in a situation of being exposed to strong solar light and the user is intentionally executing charging (power generation) or not.

If the generated power capacity P is equal to or greater than preset threshold value th, the operation shifts to step 6c. If the generated power capacity P is smaller than preset threshold value th, the operation shifts to step 6d. In other words, if it can be determined that the mobile telephone is in a situation in which the user is to positively execute charging, the operation shifts to step 6c. If it can be determined that the mobile telephone is not in a situation in which the use is to positively execute charging, the operation shifts to step 6d.

In step 6c, the power supply controller 621 stops the supply of the electric power to the IrDA signal converting unit 614 and the host module 622 having the power supply turned ON in sequences S403 and S404 to turn them OFF. The operation shifts to step 6b.

On the other hand, in step 6d, the power supply controller 621 determines whether the power supplies of both of the IrDA signal converting unit 614 and the host module 622 are in a status of being turned ON or not. If the power supplies of both of the IrDA signal converting unit 614 and the host module 622 are in a status of being turned ON, the operation shifts to step 6b. If the power supply of at least one of them is in a status of being turned ON, the operation shifts to step 6e.

In step 6e, the power supply controller 621 supplies electric power to the IrDA signal converting unit 614 and the host module 622 to turn ON both of them. The operation shifts to step 6b.

In the mobile telephone having the above--described structure, if it can be determined that the mobile telephone is in a situation in which the user is to positively execute charging, supply of the electric power to the IrDA signal converting unit 614 and the host module 622 in the operated status is stopped to turn OFF both of them.

Thus, if the mobile telephone having the above-described structure is left in a status of making solar light strongly incident thereon, it is recognized that the infrared communication not executed, supply of the electric power to the IrDA signal converting unit 614 and the host module 622 is stopped, and the electric power can be thereby saved. Therefore, since the user does riot need to execute especial operations to save the electric power while suppressing the power consumption by the infrared communication function, the mobile telephone has tiqt operability for the user and can be easily handled.

The present embodiment is not limited to the embodiments described above but the constituent elements of the embodiment can be modified in various manners without departing from the spirit and scope of the embodiment. Various aspects of the embodiment can also be extracted from any appropriate combination of a plurality of constituent elements disclosed in the embodiments. Some constituent elements may be deleted in all of the constituent elements disclosed in the e bodiments. The constituent elements described in different embodiments may be combined arbitrarily.

For example, in the above-described embodiment, in the eco-easy mode, once the user instruction (eco-easy mode ON) is made, the electric power is supplied to neither the IrDh signal converting unit 614 nor the host module 622 until the control chip 615 detects the connection request. However, the electric power may not be supplied to any one of the IrDA signal converting unit 614 and the host module 622. Even in this structure, low power consumption can be implemented to the degree corresponding to the power consumption of the module to which power is not supplied.

In addition, the above-described embodiment is provided with the change-over switch 613 and, in the eco-easy mode, the photo detector 611 is employed for both the detection of the connection request from the counterpart device MS and the reception of the infrared signal at the communication. Instead of this, however, a photodetector for the detection of the connection request from the counterpart device MS in the eco-easy mode and a photodetector for the reception of the infrared signal at the communication may be provided separately. In this case, the change-over switch 613 is unnecessary.

In other words, by providing the change-over switch 613 as described in the above embodiment, the single photodetector 611 can be employed for both the detection of the connection request from the counterpart device MS and the reception of the infrared signal at the communication.

In addition, the control chip 615 is provided at the infrared input/output unit 610, but may be provided at the control unit 620. The host module 622 may comprise the function of the control chip 615. It goes without saying that in this structure, in the eco-easy mode, the host module 622 activates the only portion corresponding to the function of the control chip 615 monitoring the connection request and turns OFF the other functions (similarly to equence S503).

In addition, the infrared signal is used in the above-described embodiment. However, this embodiment can also be applied to e case of using other radio signals, for example, near field radio communication such as Bluetooth (registered trademark) and the like.

Furthermore, the case where the power supply controller 621 supplies the operating power is explained as operation ON while the case where the power supply controller 621 supplies no operating power is explained as operation OFF. However, even if the power supply controller 621 always supplies the operating power to each unit, and turns ON/OFF the operation of each unit similarly to the processing shown in FIG. 5 and FIG. 6, the same advantage can be obtained.

In addition, if the operation is made in the general mode, the power is saved by suppressing the supply of the electric power to the IrDA signal converting unit 614 and the host module 622. However, this embodiment is not limited to this, but can also be applied to a case where the IrDA signal converting unit 614 and the host module 622 operate in the eco-easy mode.

Necessity of the power generation is determined in accordance with the power capacity P generated by the solar power generation unit 70, but this embodiment is not limited to this. For example, if the user makes an instruction for generating the electric power via the operation unit 40 and the power generation is started by the solar power generation unit 70, the power may be saved by suppressing the supply of the power to the IrDA signal converting unit 614 and the host module 622.

It goes without saying that the present embodiment can also be variously modified within a scope which does not depart from the gist of the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A near field radio communication apparatus comprising:
a signal receiving unit configured to convert a radio signal into an electric signal;
an information obtaining unit configured to obtain information from a signal output from the signal receiving unit; and
an operating power supplying unit configured to supply an operating power to the information obtaining unit if a voltage level of the electric signal output from the signal receiving unit varies to be equal to or higher than a preset threshold value and then varies to be lower than the threshold value.

2. The apparatus according to claim 1, wherein the operating power supplying unit comprises:
a voltage detecting unit configured to detect the voltage level of the electric signal output from the signal receiving unit; and
a power supplying unit configured to supply the operating power to the information obtaining unit in accordance with a detection result of the voltage detecting unit.

3. The apparatus according to claim 2, wherein if the power supplying unit supplies the operating power to the information obtaining unit, the power supplying unit stops supply of the power to the voltage detecting unit.

4. The apparatus according to claim 2, wherein the power supplying unit comprises:
a supply unit configured to supply the operating power to the information obtaining unit; and
a control unit configured to operate the supply unit in accordance with the detection result of the voltage detecting unit.

5. The apparatus according to claim 2, wherein the voltage detecting unit inputs the electric signal output from the signal receiving unit to the information obtaining unit in accordance with the voltage level of the electric signal output from the signal receiving unit.

6. The apparatus according to claim 1, wherein the signal receiving unit converts an infrared signal into the electric signal,
the apparatus further comprises a power generating unit configured to convert light energy into electric energy, and
the operating power supplying unit stops supply of the operating power to the information obtaining unit if power generation is executed by the power generating unit.

7. The apparatus according to claim 1, wherein the signal receiving unit converts an infrared signal into the electric signal,
the apparatus further comprises:
a power generating unit configured to convert light energy into electric energy; and
a power generation level detecting unit configured to detect a power level of the power generated by the power generating unit, and
the operating power supplying unit stops supply of the power to the information obtaining unit if the power level detected by the power generation level detecting unit is equal to or higher than a preset threshold value.

8. A near field radio communication apparatus comprising:
a signal receiving unit configured to convert a radio signal into an electric signal;
an information obtaining unit configured to obtain information from a signal output from the signal receiving unit; and
an operating power supplying unit configured to supply an operating power to the information obtaining unit if a voltage level of the electric signal output from the signal receiving unit repeats varying to be equal to or higher than a preset threshold value and then varying to be lower than the threshold value.

9. A near field radio communication apparatus comprising:
a signal receiving unit configured to convert a radio signal into an electric signal;
an information obtaining unit configured to obtain information from a signal output from the signal receiving unit; and
an operation control unit configured to turn ON an operation of the information obtaining unit if a voltage level of the electric signal output from the signal receiving unit varies to he equal to or higher than a preset threshold value and then varies to be lower than the threshold value.

10. The apparatus according to claim 9, wherein the operation control unit comprises:
a voltage detecting unit configured to detect the voltage level of the electric signal output from the signal receiving unit; and
a control unit configured to turn on the operation of the information obtaining unit in accordance with a detection result of the voltage detecting unit.

11. The apparatus according to claim 10, wherein if the control unit turns ON the operation of the information obtaining unit, the control unit turns OFF an operation of the voltage detecting unit.

12. The apparatus according to claim 10, wherein the control unit comprises:
an ON unit configured to turn ON the operation of the information obtaining unit; and
an ON control unit configured to operate the ON unit in accordance with a detection result of the voltage detecting unit.

13. The apparatus according to claim 10, wherein the voltage detecting unit inputs the electric signal output from the signal receiving unit to the information obtaining unit in accordance with the voltage level of the electric signal output from the signal receiving unit.

14. The apparatus according to claim 9, wherein the signal receiving unit converts an infrared signal into the electric signal,
the apparatus further comprises a power generating unit configured to convert light energy into electric energy, and
the operation control unit turns OFF the operation of the information obtaining unit if power generation. is executed by the power generating unit.

15. The apparatus according to claim 9, wherein the signal receiving unit converts an infrared signal into the electric signal,
the apparatus further comprises:
a power generating unit configured to convert light energy into electric energy; and
a power generation level detecting unit configured to detect a power level of the power generated by the power generating unit, and
the operation control unit turns OFF the operation of the information obtaining unit if the power level detected by the power generation level detecting unit is equal to or higher than a preset threshold value.

16. A near field radio communication apparatus comprising:
- a signal receiving unit configured to convert a radio signal into an electric signal;
- an information obtaining unit configured to obtain information from a signal output from the signal receiving unit; and
- an operation control unit configured to turn ON an operation of the information obtaining unit if a voltage level of the electric signal output from the signal receiving unit repeats varying to be equal to or higher than a preset threshold value and then varying to be lower than the threshold value.

17. A mobile radio terminal executing radio communication with a base station accommodated in a network, the terminal comprising:
- a signal receiving unit configured to convert a radio signal into an electric signal;
- an information obtaining unit configured to obtain information from a signal output from the signal receiving unit; and
- an operating power supplying unit configured to supply an operating power to the information obtaining unit it a voltage level of the electric signal output from the signal receiving unit varies to be equal to or higher than a preset threshold value and then varies to be lower than the threshold value.

18. The terminal according to claim 17, wherein the signal receiving unit converts an infrared signal into the electric signal,
- the apparatus further comprises a power generating unit configured to convert light energy into electric energy, and
- the operating power supplying unit stops supply of the operating power to the information obtaining unit if power generation is executed by the power generating unit.

19. The terminal according to claim 17, wherein the signal receiving unit converts an infrared signal into the electric signal,
- the apparatus further comprises:
  - a power generating unit configured to convert light energy into electric energy; and
  - a power generation level detecting unit configured to detect a power level of the power generated by the power generating unit, and
- the operating power supplying unit stops supply of the power to the information obtaining unit if the power level detected by the power generation level detecting unit is equal to or higher than a preset threshold value.

20. A mobile radio terminal executing radio communication with a base station accommodated in a network, the terminal comprising:
- a signal receiving unit configured to convert a radio signal into an electric signal;
- an information obtaining unit configured to obtain information from a signal output from the signal receiving unit; and
- an operating power supplying unit configured to supply an operating power to the information obtaining unit if a voltage level of the electric signal output from the signal receiving unit repeats varying to be equal to or higher than a preset threshold value and then varying to be lower than the threshold value.

21. A mobile radio terminal executing radio communication with a base station accommodated in a network, the terminal comprising:
- a signal receiving unit configured to convert a radio signal into an electric signal;
- an information obtaining unit configured to obtain information from a signal output from the signal receiving unit; and
- an operation control unit configured to turn ON an operation of the information obtaining unit if a voltage level of the electric signal output from the signal receiving unit varies to be equal to or higher than a preset threshold value and then varies to be lower than the threshold value.

22. The terminal according to claim 21, wherein the signal receiving unit converts an infrard signal into the electric signal,
- the apparatus further comprises a power generating unit configured to convert light energy into electric energy, and
- the operating power supplying unit turns OPh the operation of the information obtaining unit if power generation is executed by the power generating unit.

23. The terminal according to claim 21, wherein the signal receiving unit converts an infrared signal into the electric signal,
- the apparatus further comprises:
  - a power generating unit configured to convert light energy into electric energy; and
  - a power generation level detecting unit configured to detect a power level of the power generated by the power generating unit, and
- the operating power supplying unit turns OFF the operation of the information obtaining unit if the power level detected by the power generation level detecting unit in equal to or higher than a preset threshold value.

24. A mobile radio terminal executing radio communication with a base station accommodated in a network, the terminal comprising:
- a signal receiving unit configured. to convert a radio signal into an electric signal;
- an information obtaining unit configured to obtain information from a signal output from the signal receiving unit; and
- an operation control unit configured to turn ON an operation of the information obtaining unit if a voltage level of the electric signal output from the signal receiving unit repeats varying to be equal to or higher than a preset threshold value and then varying to be lower than the threshold value.

25. A near field radio communication apparatus comprising:
- a signal receiving unit configured to convert a radio signal into en electric signal;
- an information obtaining unit configured to obtain information from a signal output from the signal receiving unit; and
- an operating power supplying unit configured to supply an operating power to the information obtaining unit in accordance with en electric signal output from the signal receiving unit,
- wherein the operating power supplying unit comprises:
  - a monitoring unit configured to monitor the electric signal output from the signal receiving unit; and
  - a power supplying unit configured to supply the operating power to the information obtaining unit in accordance with a monitoring result of the monitoring unit, and wherein if the power supplying unit supplies the operating power to the information obtaining unit, the power supplying unit stops supply of the power to the monitoring unit.

26. The apparatus according to claim 25, wherein the power supplying unit comprises:
   a supply unit configured to supply the operating power to the information obtaining unit; and
   a control unit configured to operate the supply unit in accordance with the monitoring result of the monitoring unit.

27. The apparatus according to claim 25, wherein the monitoring unit inputs the electric signal output from the signal receiving unit to the information obtaining unit in accordance with the monitoring result of the electric signal output from the signal receiving unit.

28. A near field radio communication apparatus comprising:
   a signal receiving unit configured to convert a radio signal into an electric signal;
   an information obtaining unit configured to obtain information from a signal output from the signal receiving unit; and
   an operation control unit configured to turn ON an operation of the information obtaining unit in accordance with an electric signal output from the signal receiving unit,
   wherein the operation control unit comprises:
      a monitoring unit configured to monitor the electric signal output from the signal receiving unit; and
      a control unit configured to turn ON the operation of the information obtaining unit in accordance with a monitoring result of the monitoring unit, and
   wherein if the control unit turns ON the operation of the information obtaining unit, the control unit turns OFF an operation of the monitoring unit.

29. The apparatus according to claim 28, wherein the control unit comprises:
   an ON unit configured to turn ON the operation of the information obtaining unit; and
   an ON control unit configured to operate the ON unit in accordance with the monitoring result of the monitoring unit.

30. The apparatus according to claim 28, wherein the monitoring unit inputs the electric signal output from the signal receiving unit to the information obtaining unit in accordance with the monitoring result of the electric signal output from the signal receiving unit.

* * * * *